Patented July 23, 1940

2,209,243

UNITED STATES PATENT OFFICE 2,209,243 p-NITROBENZENE SULPHONAMIDO TETRAZOLES

Philip S. Winnek, Stamford, Conn., assignor to American Cyanamid Company, New York, N. Y., a corporation of Maine No Drawing. Application February 23, 1940, Serial No. 320,431

5 Claims. (Cl. 260—308)

The present invention relates to p-nitrobenzenesulphonamido tetrazole and salts thereof.

The compounds of this invention are useful as chemotherapeutic agents and also as intermediates for preparing other chemical compounds.

The compounds of the present invention have the following formula:

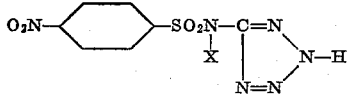

in which X is either hydrogen or a metal.

While the present invention is not limited to any particular process of preparing the compounds I have found that good yields of high quality products are obtained by reacting 5 amino-tetrazole monohydrate with p-nitrobenzene sulphonyl chloride in the presence of pyridine or other suitable organic solvent such as dioxane and the like, diluting with water to precipitate the reaction product, and recrystallizing from a suitable solvent such as glacial acetic acid.

The following examples specifically illustrate the preferred method of preparing these new compounds without, however, being restricted thereby.

The parts are expressed by weight except in the case of liquids which are expressed in corresponding parts by volume.

EXAMPLE 1

*5-(p-nitrobenzene sulphonamido)-tetrazole*

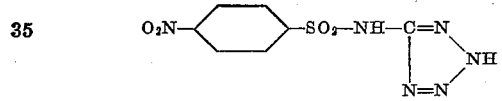

Twenty-five parts of 5-amino-tetrazole monohydrate are stirred with 125 parts of anhydrous pyridine while 50 parts of p-nitrobenzene sulphonyl chloride are added rapidly. The mixture is stirred until it has reached room temperature and is then diluted with 125 parts of water. The solid is filtered off and washed by suspension in three 500 part portions of boiling water.

This solid is recrystallized from a boiling mixture of 500 parts of water and 2000 parts of glacial acetic acid with the addition of charcoal. The 5-(p-nitrobenzene sulphonamido)-tetrazole is dried at about 80° C.

EXAMPLE 2

*Sodium salt of 5-(p-nitrobenzene sulphonamido)-tetrazole*

The sodium salt is prepared by adding 5-(p-nitrobenzenesulphonamido)-tetrazole to an equivalent amount of sodium hydroxide in a small volume of water. The mixture is warmed on a steam bath until solution is complete. On cooling the solution the sodium salt crystallizes out.

What I claim is:

1. The p-nitrobenzenesulphonamido tetrazoles having the following formula:

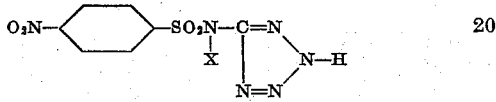

in which X represents a member of the group consisting of hydrogen and alkali metals.

2. The p-nitrobenzenesulphonamido tetrazole having the following formula:

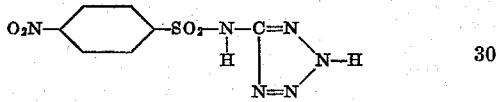

3. The alkali metal salts of the p-nitrobenzenesulfonamido tetrazole of claim 2.

4. The process of preparing p-nitrobenzenesulphonamido tetrazoles which comprises reacting an amino tetrazole monohydrate with p-nitrobenzene sulphonyl chloride in the presence of an organic solvent and separating the reaction products.

5. The process of preparing p-nitrobenzenesulphonamido tetrazoles which comprises reacting an amino tetrazole monohydrate with p-nitrobenzene sulphonyl chloride in the presence of pyridine and separating the reaction product.

PHILIP S. WINNEK.